UNITED STATES PATENT OFFICE.

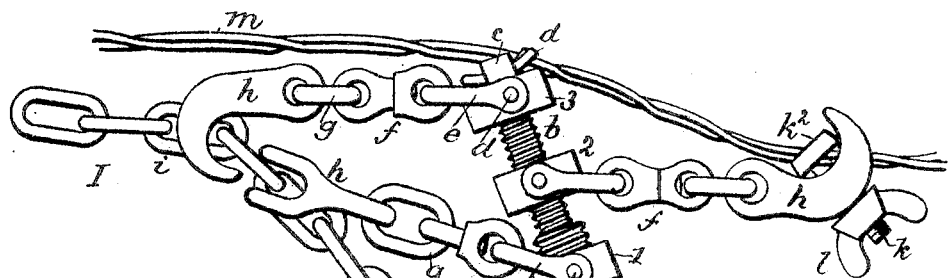
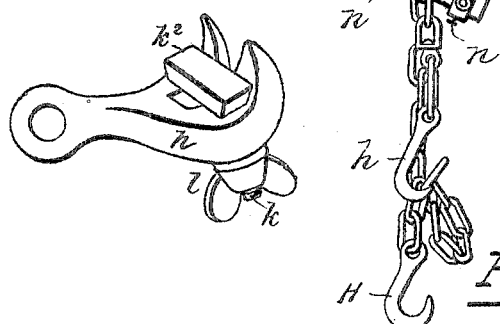
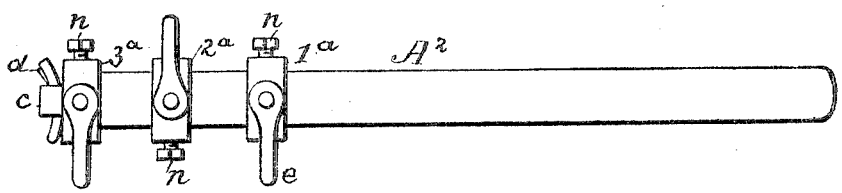

JOHN F. BOYD, OF MARINETTE, WISCONSIN.

CHAIN-LEVER.

No. 797,715.          Specification of Letters Patent.          Patented Aug. 22, 1905.

Application filed June 22, 1905. Serial No. 266,416.

*To all whom it may concern:*

Be it known that I, JOHN F. BOYD, a citizen of the United States, residing at Marinette, in the county of Marinette and State of Wisconsin, have invented certain new and useful Improvements in Chain-Levers, of which the following is a specification.

This invention relates to chain-levers adapted for use as a weight-lifter, a stump-puller, a load-binder, and a wire-stretcher for fences, using a lever and chain, and hooks connected to said lever; and the objects are to furnish an improved device which is adjustable to any size chain and in which the fulcrum is adjustable on the lever relatively to the fulcrum of each chain-hook to regulate in an instant the power to be obtained from the lever, or the speed at which the weight is lifted, or the speed at which the wire of wire fences is to be drawn upon and made taut from a slack condition, the middle hook for this use being provided with a clamping-bolt and thumb-nut, the device being simple in construction and convenient in use.

I attain these objects by the construction illustrated in the accompanying drawings, in which—

Figure 1 is a side view of the device connected to a fence-wire consisting of twin wires and a portion of a chain for the hooks to engage with. Fig. 2 is a perspective view of the middle hook carrying a wire-clamping bolt and a thumb-nut thereon. Fig. 3 is a modification of the operating-lever and sleeves adjustably secured thereon. Fig. 4 shows the device connected to a vertical chain as used to lift weights.

In said drawings, A represents the operating-lever, which is cylindrical and has cut thereon about one-third of its operating end a right-hand double screw-thread $a$. On the outer end of said screw-thread the lever is of reduced diameter and has cut thereon a right-hand screw-thread $b$, the outer end of which thread is turned off to form a smooth journal $c$, upon which is mounted a sleeve 3, which can revolve thereon and is retained against the end of the screw $b$ by means of a split key $d$ passing through the end of the journal $c$. Upon the screw-threaded portion $b$ there is mounted a screw-tapped sleeve 2, and upon the screw-threaded portion $a$ there is mounted a screw-tapped sleeve 1, intended to advance twice the distance upon the portion $a$ that the sleeve 2 advances upon the threaded portion $b$ for one revolution of the lever, so that the distance maintained between the sleeve 2 and the sleeve 3 will be the same as the distance between said sleeve 2 and the sleeve 1, and the throw of the lever A will be the same for each sleeve 1 and 3 and the hooked chains attached to said sleeves.

Each sleeve 1, 2, and 3 is provided with trunnions $d$, to which are pivoted the ends of a clevis $e$, which is connected to one end of a turnbuckle $f$, the opposite end of which is connected, by means of a chain-link $g$, to a forked hook $h$ of suitable length, the branches of which are adapted to straddle the links $i$ of any suitable chain I, the space between the branches of the hook being of suitable size to freely receive flatwise the adjacent link of the chain I. One end of said chain can be secured to a fence-post or to any other non-yielding object upon which the device is operated by swinging the lever A first to one side and shifting the hook $h$ forward to another link of the chain I and then swinging the lever A to the opposite side. The middle hook and chain attached to the middle sleeve 2 acts as a fulcrum for the lever A and is thereby advanced toward the chain I by swinging the lever.

When the device is to be used to stretch the wires of a fence, the hook $h$, connected to the middle sleeve 2, is provided with a bolt $k$, made to pass between the branches of said hook. Said bolt has a broad head $k^2$ in the form of a parallelogram, which overlaps the branches of the hook and also the fence-wires $m$, the latter being made to pass alongside of the body of the bolt and between the branches of the hook. Upon the threaded end of the bolt is placed a thumb-nut $l$, by means of which the fence-wires are tightly clamped and secured to the hook.

In the modification shown in Fig. 3 screw-threads are dispensed with on the lever $A^2$; but the sleeves $1^a$ $2^a$ $3^a$ are provided with set-screws or binding-screws $n$ the ends of which impinge upon said lever, and the sleeves are thus made adjustable in position relatively to each other, and the leverage given to the two outer chains relatively to the central fulcrum-chain can be changed in a very few minutes. Although the lever $A^2$ is preferably cylindrical, it may consist of a flat bar with correspondingly-formed sleeves thereon with binding-screws to adjust their location upon the lever without departing from the spirit of my invention.

In Fig. 4 the device is connected to a chain I in a vertical position and adapted to lift weights, said chain being for that purpose provided with a plain hook H on its lower end. The fulcrum-hook of the device is in engagement with the looped lower portion of said chain, while the hooks of the two upper chains are in engagement with the upper portion of the chain, so that by swinging vertically the lever $A^2$ said upper hooks are adapted to engage successively with the upper links of the chain, the lever being provided with sleeves adjustably retained thereon by binding-screws $n$, as described with relation to Fig. 3.

Having now fully described my invention, I claim—

1. A chain-lever consisting of a lever and three sleeves thereon, two of said sleeves being adjustable relatively to each other and to the third sleeve, with chains connected to said sleeves, and hooks on the outer ends of the chains, substantially as described.

2. In a chain-lever the combination of a lever having two screw-threaded portions toward one end thereof, two screw-tapped sleeves adjustable thereon and a sleeve on the end of the lever, each sleeve having trunnions, a clevis pivoted to said trunnions and a chain and hook connected to said clevis, substantially as described.

3. A chain-lever adapted for use as a wire-stretcher, consisting of a lever and three sleeves thereon, two of said sleeves being adjustable relatively to each other and to the third sleeve, with chains connected to said sleeves and forked hooks on the outer ends of the chain, a bolt received between the branches of one of said hooks with its head resting on said branches, and a thumb-nut upon said bolt, substantially as described.

In testimony whereof I affix my signature in presence of two witnesses.

JOHN F. BOYD.

Witnesses:
R. G. HUTCHINSON,
A. BURR SCOTT.